United States Patent
Hiskes

(10) Patent No.: US 8,091,228 B2
(45) Date of Patent: Jan. 10, 2012

(54) METHOD REPAIR OF TURBINE BLADE TIP

(75) Inventor: David J. Hiskes, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 1176 days.

(21) Appl. No.: 11/842,181

(22) Filed: Aug. 21, 2007

(65) Prior Publication Data

US 2009/0049689 A1    Feb. 26, 2009

(51) Int. Cl.
*B23P 6/00* (2006.01)

(52) U.S. Cl. ...................... 29/889.1; 416/97 R

(58) Field of Classification Search .......... 29/889.1; 416/97 R
See application file for complete search history.

(56) References Cited

U.S. PATENT DOCUMENTS

| | | | | |
|---|---|---|---|---|
| 3,626,568 A * | 12/1971 | Silverstein | ........ | 29/889.72 |
| 4,010,531 A * | 3/1977 | Andersen et al. | ........ | 29/889.721 |
| 4,073,599 A * | 2/1978 | Allen et al. | ........ | 416/97 R |
| 4,247,254 A * | 1/1981 | Zelahy | ........ | 416/97 R |
| 4,411,597 A * | 10/1983 | Koffel et al. | ........ | 416/92 |
| 5,264,011 A | 11/1993 | Brown et al. | | |
| 5,564,902 A * | 10/1996 | Tomita | ........ | 416/97 R |
| 6,332,272 B1 * | 12/2001 | Sinnott et al. | ........ | 29/889.1 |
| 6,464,128 B1 | 10/2002 | Messelling et al. | | |
| 6,478,537 B2 | 11/2002 | Junkin | | |
| 6,502,303 B2 * | 1/2003 | Updegrove et al. | ........ | 29/889.1 |
| 6,908,288 B2 | 6/2005 | Jackson et al. | | |
| 6,916,150 B2 * | 7/2005 | Liang | ........ | 415/115 |
| 7,001,151 B2 * | 2/2006 | Wang et al. | ........ | 416/92 |
| 2005/0091848 A1 * | 5/2005 | Nenov et al. | ........ | 29/889.1 |
| 2009/0155083 A1 * | 6/2009 | Rose | ........ | 416/223 R |

* cited by examiner

*Primary Examiner* — David Bryant
*Assistant Examiner* — Jacob Cigna
(74) *Attorney, Agent, or Firm* — Carlson Gaskey & Olds, P.C.

(57) ABSTRACT

A method of repair of a turbine blade involves inspecting a turbine blade having an internal cavity and a cap. The cap is removed and replaced with a replacement cap. The replacement cap has an opening. The opening provides access to the internal cavity of the internal blade so that the replacement cap may be attached to the turbine blade through the opening.

21 Claims, 4 Drawing Sheets

METHOD REPAIR OF TURBINE BLADE TIP

BACKGROUND OF THE INVENTION

This invention generally relates to a method of repairing a turbine blade of a turbine engine.

A turbine blade of a turbine engine has a blade body and an integrally formed blade tip. A tip cap is a piece that is inserted into a recess formed in the blade tip to cover the internal cavity of the blade body. The area near the tip of the turbine blade is subject to significant stress and wear. Accordingly, the turbine blade may require repair or replacement because of wear proximate the tip. Because of the high expense of the turbine blade, it is preferable to attempt to repair the turbine blade rather than replace it. However, this process may be both labor intensive and time consuming.

Techniques do exist for removing and replacing the blade tip from the blade body of the turbine blade. A challenge faced in the replacement of a blade tip is to create a strong connection between the tip and the blade body. Generally, the edge of the tip is welded to the exterior walls of the blade body. This connection may not be as secure, however, as the connection between the original blade tip and the original blade body.

A need therefore exists for a more secure connection between blade tip and blade body in the repair of the turbine blade.

SUMMARY OF THE INVENTION

The invention involves a technique for repairing a turbine blade. The turbine blade has an internal cavity with a cap that covers the cavity. The old cap is removed and replaced with a replacement cap. The replacement cap is then connected to the turbine blade through an opening in the replacement cap that provides access to the internal cavity of the turbine blade.

The turbine blade may have a structural support disposed in the internal cavity. The opening provides access to the structural support for attaching the replacement cap. The opening may be further aligned with the structural support and allow direct attachment of the replacement cap to the structural support. The replacement cap may be welded to the structural support through the opening.

The replacement cap has a perimeter for attachment to the turbine blade. Disposed within the perimeter of the cap is an opening sized to permit attachment of the cap to the internal structural supports of the turbine blade through the opening. The opening is further arranged within the perimeter to allow its direct alignment with the internal structure of the turbine blade. The opening may be subsequently filled following attachment of the cap to the turbine blade.

The various features and advantages of this invention will become apparent to those skilled in the art from the following detailed description. The drawings that accompany the detailed description can be briefly described as follows.

DETAILED DESCRIPTION

Figure 1:
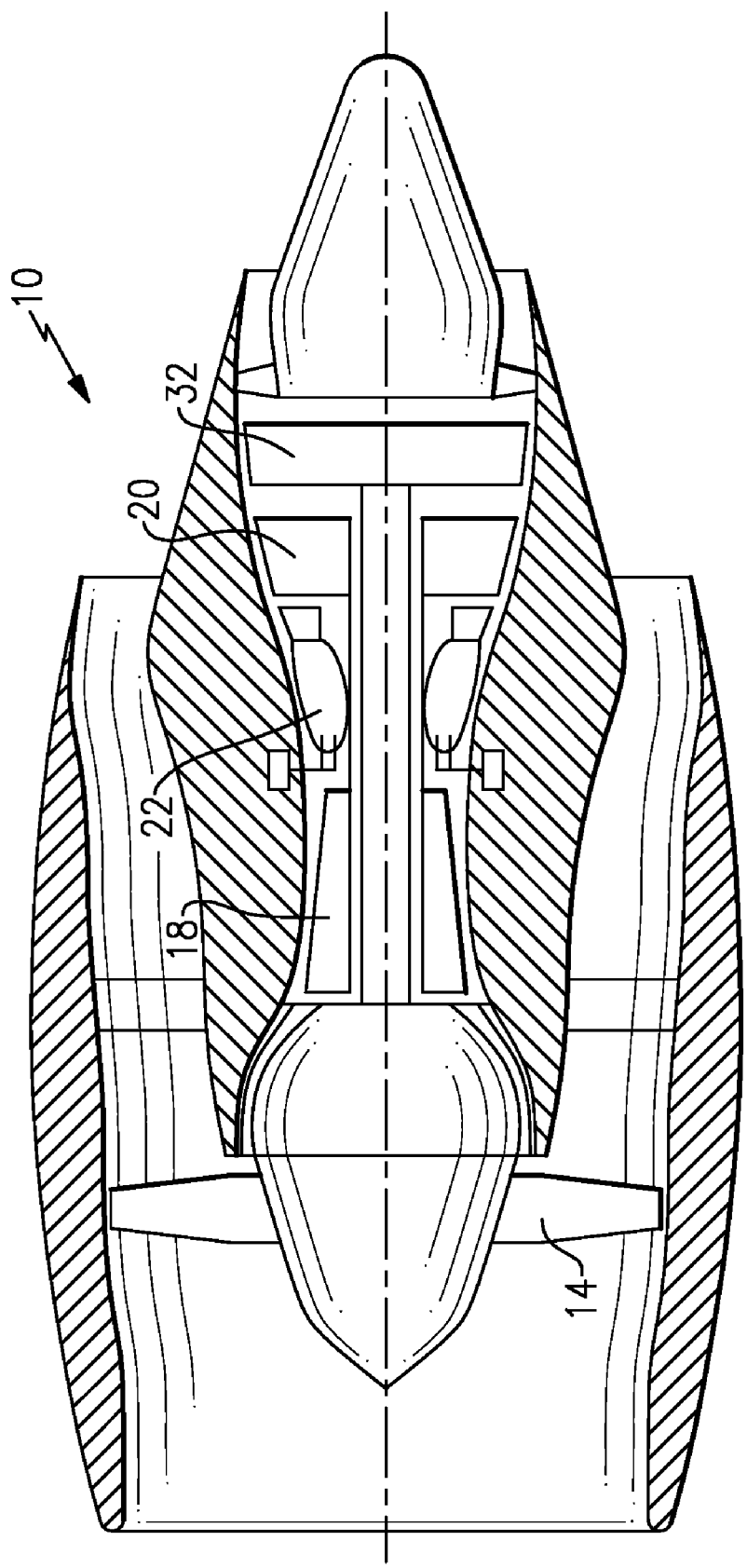
FIG. 1 illustrates a view of a turbine engine known in the art.

FIG. 1 illustrates an example of a gas turbine engine 10, here a turbofan engine, that would benefit from the inventive repair technique. As other types of gas turbine engines will likewise benefit from the inventive technique, the term gas turbine engine is not limited to the disclosed embodiment. As shown, gas turbine engine 10 has fan 14 which propels ambient air into gas turbine engine 10. Multi-stage high and low pressure compressors 18 compress the air. The compressed air is then mixed with fuel and ignited in a combustor 22, where the gas expands. Expanded gas then passes through high pressure turbine section 20 and low pressure turbine section 32 as known and passes out of gas turbine engine 10.

Figure 2:
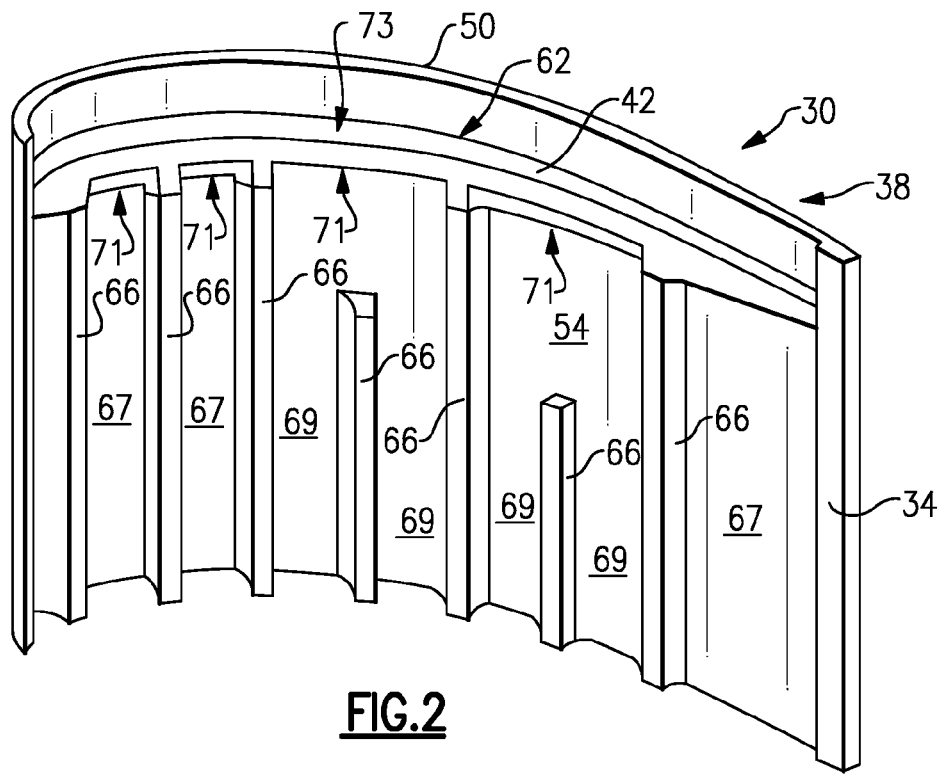
FIG. 2 illustrates a cross-sectional view of a turbine blade of the turbine engine of FIG. 1.

FIG. 2 illustrates a turbine blade 30 as known in the art. Here, turbine blade 30 is shown in cross-section with dashed lines showing the perimeter of turbine blade 30. As shown, turbine blade 30 has blade body 34 and blade tip 38. In addition, blade tip 38 has cap 42 that covers internal cavity 54. Squealer 50, a rail, extends around the perimeter 62. Within blade body 34 is internal cavity 54, which has structural supports 66 extending throughout to support turbine blade 30 as known. Between structural supports 66 are cooling passages 67, 69. These cooling passages 67, 69 permit air to cool blade body 34 as known. Cap 42 has internal cavities 71 that permit air to come close to surface 73 of cap 42 for air to cool so as to relieve heat buildup within blade body 34.

Figure 3:
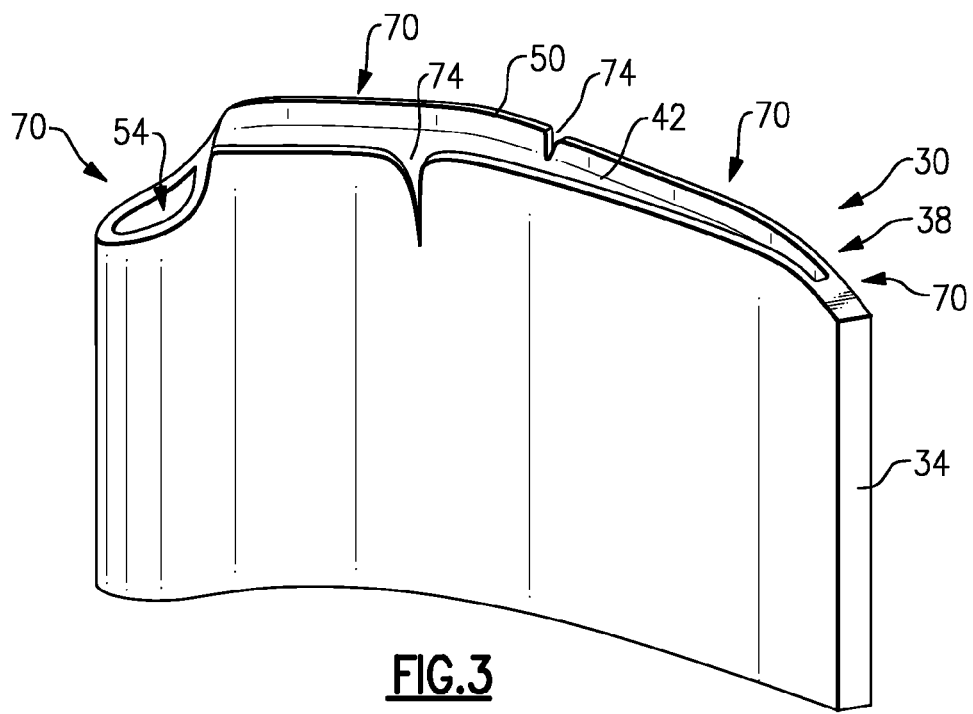
FIG. 3 illustrates an example of a worn turbine blade.

Due to stress and wear, turbine blade 30 may develop areas of wear 70 and cracks 74, as shown in FIG. 3. Indeed, areas of wear may be large enough to expose internal cavity 54 as shown. Because of the high expense of replacing turbine blade 30, it may be desirable to repair it. FIGS. 3-7 illustrate the inventive repair technique.

Figure 4:
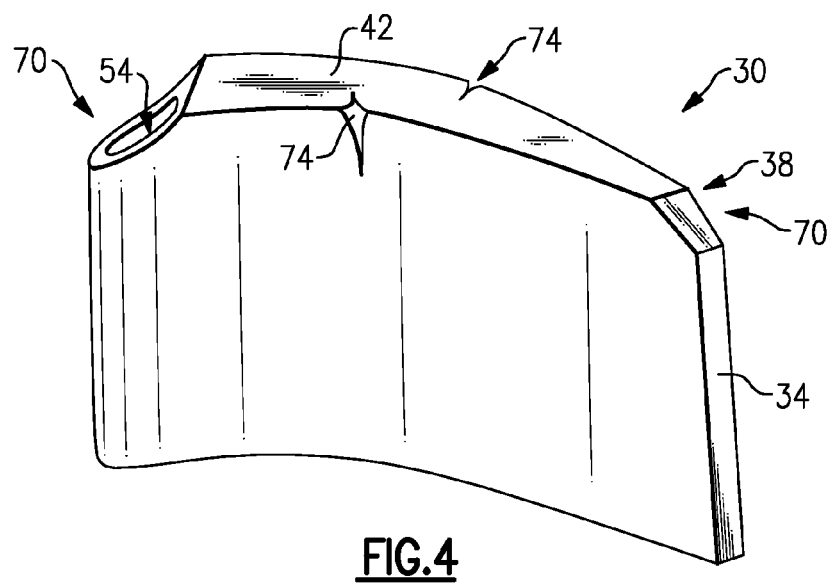
FIG. 4 illustrates an aspect of the inventive technique of repairing a turbine blade.

As shown in FIG. 3, the inventive repair technique involves grinding down squealer 50 of the worn turbine blade 30 shown in FIG. 3 to the level of cap 42 as shown in FIG. 4. Following this step, areas of wear 70 and cracks 74 are built-up by welding with weld wire to the level of cap 42. When this step is complete, cap 42 is removed by electrical discharge machining, leaving blade body 34 with exposed internal cavity 54 as shown in FIG. 5.

Following removal of cap 42, replacement cap 46 is disposed over blade body 34. Replacement cap 46 is similar to cap 42 in shape and structure. However, replacement cap 46 has openings 58 that permit access to internal cavity 54 when replacement cap 46 is placed into blade body 34. Replacement cap 46 has perimeter 62 that serves to interface with wall 36 of blade body 34 so that replacement cap 46 may nest flush with wall 36 as shown in FIG. 7.

Figure 5:
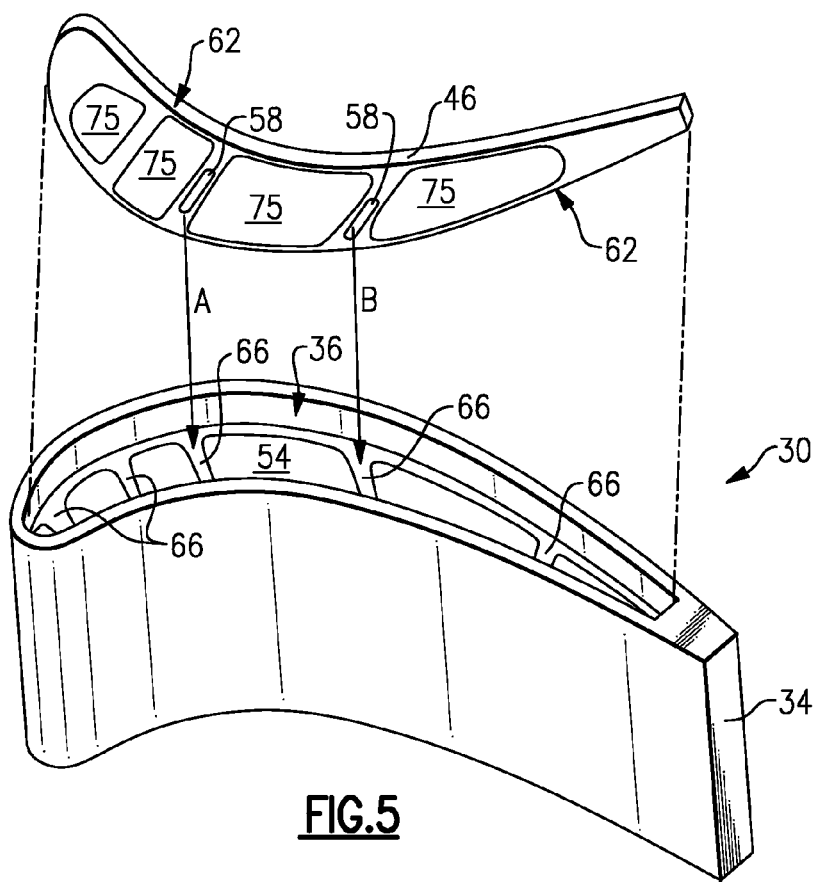
FIG. 5 illustrates another aspect of the inventive technique, highlighting replacement cap with openings permitting access to an internal cavity of the turbine blade.
Figure 6:
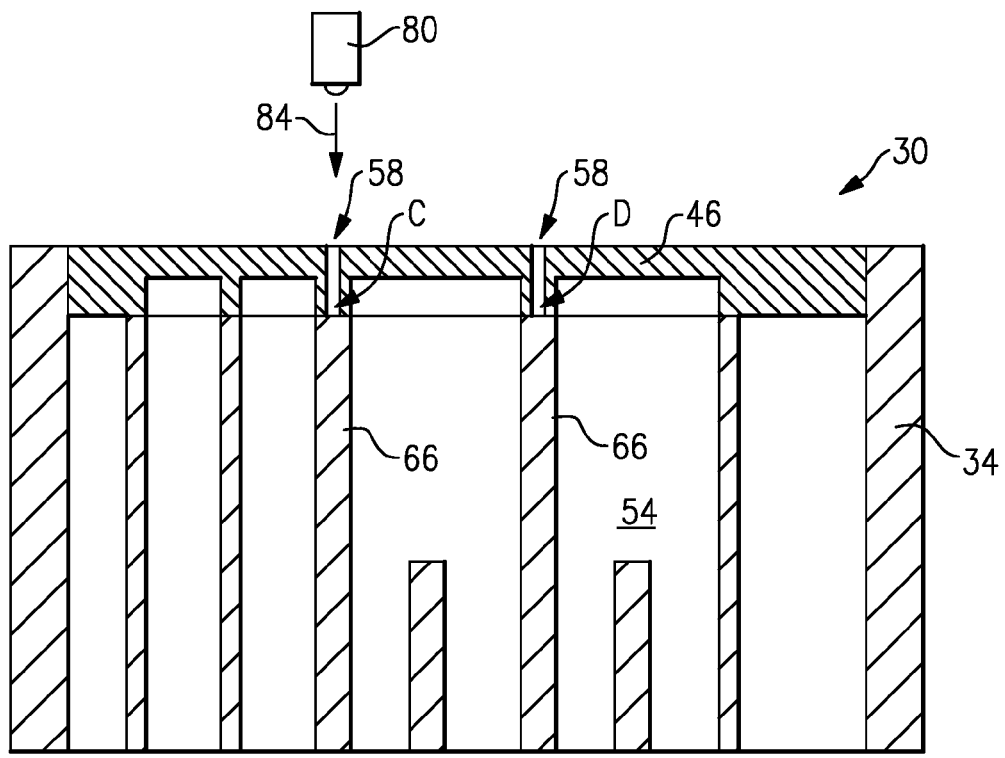
FIG. 6 illustrates a side cross-sectional view of the turbine blade with replacement cap.

As shown in FIG. 5, openings 58 are aligned with structural supports 66 disposed within internal cavity 54 so that when replacement cap 46 is seated in blade body 34 within wall 36, openings 58 will provide direct access to structural supports 66 as shown in FIG. 6 in cross-section. Openings 58 are aligned along arrows A and B as shown in FIG. 5. Furthermore, perimeter 62 is sized and shaped so that when replacement cap 46 is disposed in blade body 34 alignment of openings 58 occurs just by seating replacement cap 46 in blade body 34. In addition, internal cavities 75 are positioned within replacement cap 46 to mimic internal cavities 71 of original cap 42.

As shown in FIG. 6, openings 58 are sized sufficiently large enough to permit welding of replacement cap 46 to structural supports 66 at points C and D by weld source 80 projecting beam 84. Beam 84 may be a laser or other known welding technique. In this way, replacement cap 46 may be directly welded to structural supports 66 located within internal cavity 54. Following this welding operation, openings 58 are then filled with welding wire of the same material as replacement cap 46.

Figure 7:
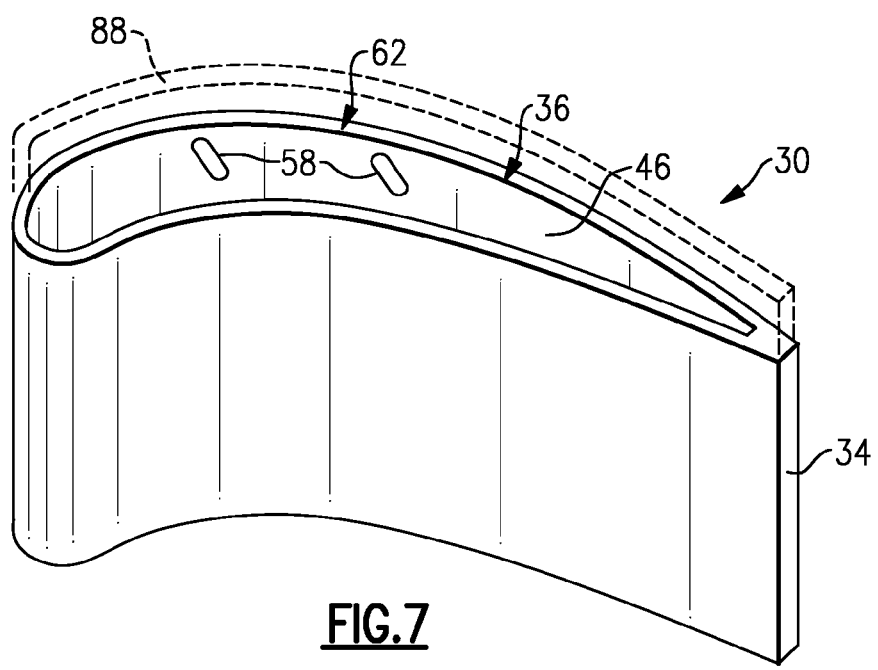
FIG. 7 illustrates a perspective view of the turbine blade with replacement cap.

With reference to FIG. 7, perimeter 62 of replacement cap 46 is also welded along wall 36. Then, with weld wire, squealer 88 is built to the original shape of squealer 50 but to a height higher than the original height of squealer 50 so that squealer 88 may be ground down to the correct height. Following this operation, the outside of turbine blade 30 is ground to remove weld beads. Electrical discharge machining may be used to remove weld beads around perimeter 62 of replacement cap 46.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

The invention claimed is:

1. A method of repairing a turbine blade, comprising the steps of:
 a) inspecting a turbine blade having an internal cavity and having a cap;
 b) removing the cap;
 c) replacing the cap with a replacement cap; and
 d) attaching the replacement cap to the turbine blade through an opening in the replacement cap that provides access to the internal cavity of the turbine blade.

2. The method of claim 1 including the step of:
 f) welding the replacement cap to the turbine blade through the opening.

3. The method of claim 1 wherein the replacement cap defines a perimeter, the opening disposed within the perimeter.

4. The method of claim 1 including a plurality of cooling cavities disposed on the replacement cap.

5. The method of claim 1, wherein the replacing comprises seating the replacement cap within a wall of the turbine blade such that an outer perimeter of the replacement cap interfaces directly with the wall.

6. The method of claim 1, wherein the replacing comprising placing the replacement cap within a wall of the turbine blade such that replacement cap is flush with the wall.

7. The method of claim 1 including the step of:
 g) filling the opening.

8. The method of claim 7 wherein step g) follows step d).

9. The method of claim 1 wherein the turbine blade has a structural support disposed in the internal cavity, the opening providing access to the structural support.

10. The method of claim 9 wherein the opening is aligned with the structural support.

11. The method of claim 9 including the step of:
 e) attaching the replacement cap to the structural support through the opening.

12. The method of claim 11 wherein the step e) comprises welding the replacement cap to the structural support through the opening.

13. A method of repairing a turbine blade, comprising the steps of:
 a) inspecting a turbine blade having an internal cavity and having a cap;
 b) removing the cap;
 c) replacing the cap with a replacement cap; and
 d) attaching the replacement cap to the turbine blade through an opening in the replacement cap that provides access to the internal cavity of the turbine blade, wherein the replacement cap defines a perimeter and the opening is disposed within the perimeter and wherein the turbine blade has a structural support disposed in the internal cavity, the opening providing access to the structural support.

14. The method of claim 13 wherein the opening is aligned with the structural support.

15. The method of claim 13 including the step of:
 f) welding the replacement cap to the turbine blade through the opening.

16. The method of claim 13, wherein the replacing comprises placing the replacement cap within a wall of the turbine blade such that a radially outer surface of the replacement cap is flush with radially outer surface of the wall.

17. The method of claim 13, wherein the replacement cap comprises internal cavities that are aligned with internal cavities of the turbine blade.

18. The method of claim 13 including the step of:
 e) attaching the replacement cap to the structural support through the opening.

19. The method of claim 18 wherein the step e) comprises welding the replacement cap to the structural support through the opening.

20. The method of claim 13 including the step of:
 g) filling the opening.

21. The method of claim 20 wherein step g) follows step d).

* * * * *